United States Patent
Tatsukawa et al.

(10) Patent No.: US 6,710,700 B1
(45) Date of Patent: Mar. 23, 2004

(54) VEHICLE KEY SYSTEM

(75) Inventors: Hirofumi Tatsukawa, Tokyo (JP); Hisashi Ishikura, Tokyo (JP); Toru Morita, Tokyo (JP); Keiichi Enoki, Tokyo (JP); Masaru Fuku, Tokyo (JP); Fumitaka Satou, Tokyo (JP); Koji Nagao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 435 days.

(21) Appl. No.: 09/648,629

(22) Filed: Aug. 28, 2000

(30) Foreign Application Priority Data

Mar. 21, 2000 (JP) ........................................ 2000-078930

(51) Int. Cl.[7] .......................... G05B 19/00; G06F 7/00; G08B 29/00; H04B 1/00; H04Q 9/00
(52) U.S. Cl. ..................... 340/5.53; 340/5.54; 340/5.52
(58) Field of Search ............................ 340/5.53, 5.21, 340/5.64, 5.72, 5.8, 5.83, 5.85, 5.51, 5.54, 5.61, 825.69, 825.72, 5.26; 382/115, 116, 124; 701/2, 32, 49; 341/176

(56) References Cited

U.S. PATENT DOCUMENTS

| 5,073,928 | A | * | 12/1991 | Shimanuki | 379/70 |
| 5,245,329 | A | * | 9/1993 | Gokcebay | 340/825.31 |
| 5,412,379 | A | * | 5/1995 | Waraksa et al. | 340/825.72 |
| 5,867,802 | A | * | 2/1999 | Borza | 701/35 |
| 6,041,410 | A | * | 3/2000 | Hsu et al. | 713/186 |
| 6,078,265 | A | * | 6/2000 | Bonder et al. | 340/825.31 |
| 6,140,939 | A | * | 10/2000 | Flick | 340/825.69 |
| 6,144,293 | A | * | 11/2000 | Plaschko et al. | 340/426 |
| 6,164,403 | A | * | 12/2000 | Wuidart | 180/287 |
| 6,181,254 | B1 | * | 1/2001 | Vogele | 340/825.69 |
| 6,278,887 | B1 | * | 8/2001 | Son et al. | 455/566 |

FOREIGN PATENT DOCUMENTS

| JP | 5-55791 | 3/1993 | ........... E05B/49/00 |
| JP | 11-93478 | 4/1999 | ........... E05B/49/00 |

* cited by examiner

Primary Examiner—Michael Horabik
Assistant Examiner—Nam Nguyen
(74) Attorney, Agent, or Firm—Sughrue Mion, PLLC

(57) ABSTRACT

A vehicle key system comprises a transmitter including a fingerprint information capturing unit for capturing fingerprint information from a user's fingerprint, and a transmit unit for transmitting the fingerprint information captured by the fingerprint information capturing unit. The system also includes an attaching unit disposed in a vehicle, for attaching the transmitter thereto, and a receiver disposed in the vehicle, including a receive unit for receiving the fingerprint information transmitted from the transmit unit of the transmitter, a fingerprint verification unit for verifying the fingerprint information against a list of pieces of previously stored fingerprint information, an attaching detection unit for determining whether or not the transmitter is attached to the attaching unit, and a control unit for controlling pieces of equipment in the vehicle according to a verification result from the fingerprint verification unit and a detection result from the mounting detection unit. The user can manipulate the pieces of equipment, e.g. start the engine, by actuating a switch, only when the electronic key transmitter is attached to the attaching unit.

2 Claims, 8 Drawing Sheets

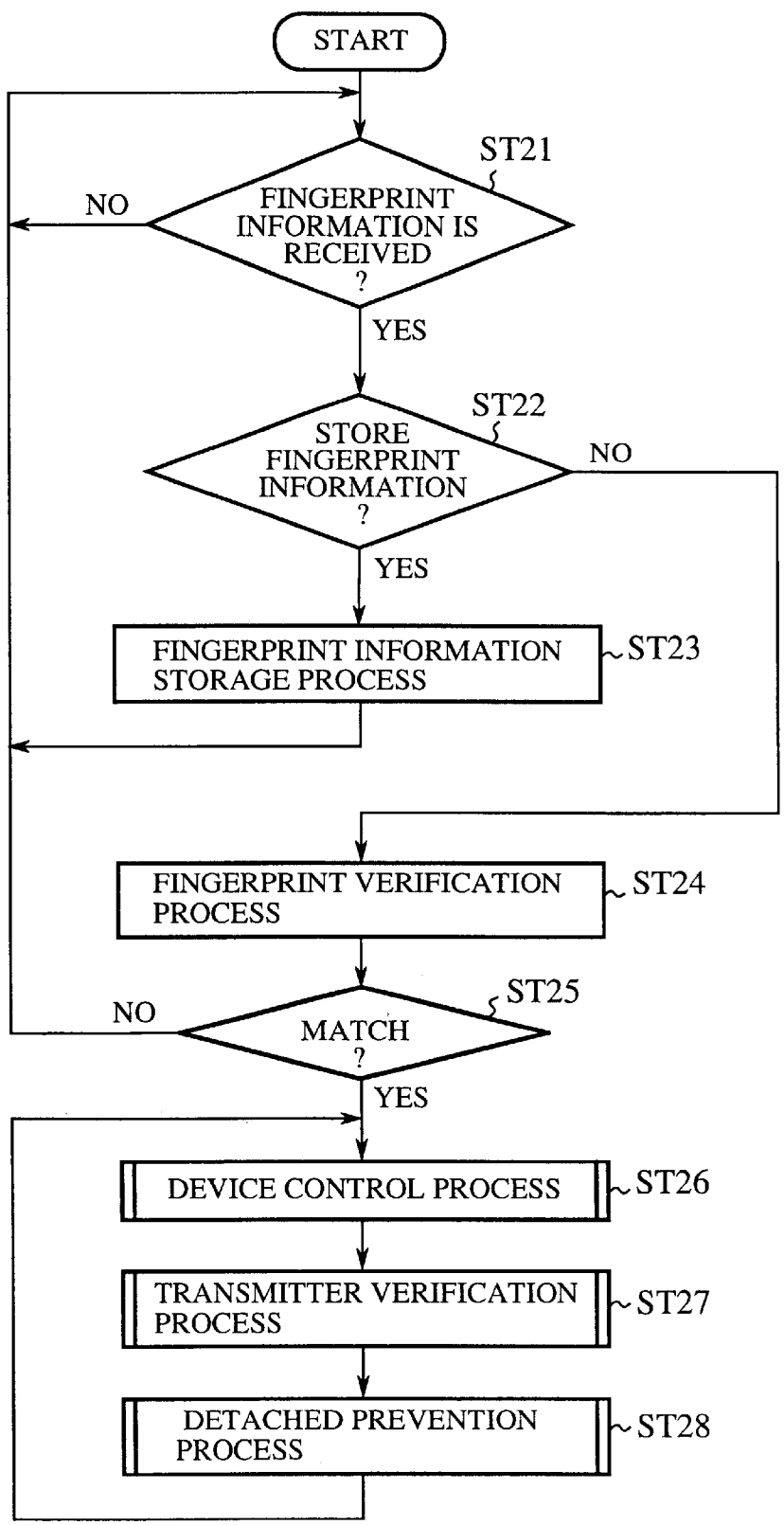

VEHICLE KEY SYSTEM

BACKGROUND OF THE INVENTION

1. Field of the Invention

The present invention relates to a vehicle key system for verifying the identity of fingerprint information captured and for controlling pieces of equipment in a vehicle according to the verification result. More particularly, it relates to a vehicle key system capable of surely protecting vehicles from theft.

2. Description of the Prior Art

In a conventional vehicle key system as disclosed in Japanese patent publication (TOKKOUHEI) 5-22791 or Japanese patent application publication (TOKKAIHEI) 11-93478, fingerprint information captured by a sensor or the like is transmitted from a mobile transmitter to a receiver mounted on a vehicle and the fingerprint information is verified against previously stored fingerprint information. The vehicle key system can release the lock of doors only if they match. As disclosed in Japanese patent application publication (TOKKAIHEI) 11-93478, the mobile transmitter can be integral with a key intended for the vehicle. In this case, the lock of doors can be released without insertion of the key into a key cylinder. All the user has to do in order to start the engine is mechanically insert the key into the key cylinder, which is located inside the vehicle and which is usually disposed in the vicinity of the steering wheel.

A problem with a conventional vehicle key system constructed as above is that there is a need to provide a key cylinder inside the vehicle in order to allow the user to start the engine, for example, and therefore there is a possibility that someone breaks a door window, intrudes, and then manipulates the key cylinder by fraudulent means or breaks the key cylinder to steal the vehicle.

Another problem is that there is a possibility that someone intercepts the fingerprint information transmitted from the mobile transmitter to the receiver mounted on the vehicle, and releases the lock of doors by transmitting the fingerprint information intercepted to the receiver using a mobile transmitter which he or she has gotten by fraudulent means.

SUMMARY OF THE INVENTION

The present invention is proposed to solve the above problems. It is therefore an object of the present invention to provide a vehicle key system comprising an attaching mechanism disposed inside a vehicle for attaching a mobile transmitter thereto, an attaching detection mechanism for determining whether or not a mobile transmitter is attached to the attaching mechanism, and a function of allowing the user to manipulate pieces of equipment in the vehicle, for example, to start the engine, only when the user's mobile transmitter is attached to the attaching mechanism, thereby eliminating the need for providing a key cylinder and improving the security of the vehicle.

It is another object of the present invention to provide a vehicle key system for verifying the identity of mobile transmitters based on identification codes and passwords assigned to them, in addition to verification of the identity, of users based on the fingerprint information about fingerprints of those users, thereby preventing fraud, such as a fraudulent release of the lock of doors, from being committed on the vehicle even when someone gets a mobile transmitter by fraudulent means.

In accordance with one aspect of the present invention, there is provided a vehicle key system for verifying identity of fingerprint information about a user's fingerprint and for controlling pieces of equipment in a vehicle according to a verification result, the system comprising: a transmitter including a fingerprint information capturing unit for capturing fingerprint information from a user's fingerprint, and a transmit unit for transmitting the fingerprint information captured by the fingerprint information capturing unit; an attaching unit disposed in the vehicle, for attaching the transmitter thereto; and a receiver disposed in the vehicle, including a receive unit for receiving the fingerprint information transmitted from the transmit unit of the transmitter, a fingerprint verification unit for verifying the fingerprint information against a list of pieces of previously stored fingerprint information, an attaching detection unit for determining whether or not the transmitter is attached to the attaching unit, and a control unit for controlling the pieces of equipment in the vehicle according to a verification result from the fingerprint verification unit and a detection result from the mounting detection unit.

In accordance with a preferred embodiment of the present invention, the vehicle key system further comprises a detached prevention unit for securing the transmitter to the attaching unit according to how the control unit controls the pieces of equipment in the vehicle.

Preferably, the receiver can include a transmitter verification unit for verifying identity of the transmitter. In this case, the control unit can control the pieces of equipment in the vehicle according to the verification result from the fingerprint verification unit, the detection result from the mounting detection unit, and a verification result from the transmitter verification unit.

In accordance with another preferred embodiment of the present invention, the transmitter includes an identifier transmitting unit for transmitting an identifier specific to the transmitter. The receiver can include an identifier receiving unit for receiving the identifier from the transmitter. The transmitter verification unit can compare the identifier received by the identifier receiving unit with one or more previously stored identifiers to verify the identity of the transmitter.

Preferably, the identifier transmitting unit transmits a password as well as the identifier. The identifier receiving unit can also receive the password from the transmitter, and the transmitter verification unit can also compare the password received by the identifier receiving unit against a previously stored corresponding password, in addition to the comparison between the identifier received by the identifier receiving unit and one or more previously stored identifiers, to verify the identity of the transmitter.

In accordance with another preferred embodiment of the present invention, the receiver includes a password generating unit for generating a new password every time a predetermined process is performed, and a password transmitting unit for transmitting the new password generated by the password generating unit. The transmitter can include a password receiving unit for receiving the new password, and a password updating unit for replacing the previous password with the new password received by the password receiving unit. Preferably, every time the receiver is authenticated, the password generating unit generates a new password for the receiver.

In accordance with another preferred embodiment of the present invention, the vehicle key system further comprises another transmitter including an identifier receiving unit for receiving an identifier from the receiver, and an identifier storing unit for storing the identifier received by the identifier receiving unit in the other transmitter, as well as the fingerprint information capturing unit, the transmit unit, and the identifier transmitting unit. The receiver can include an identifier transmitting unit for transmitting the identifier specific to the transmitter to the other transmitter.

In accordance with another preferred embodiment of the present invention, the vehicle key system further comprises another transmitter including an identifier receiving unit for receiving an identifier and a password from the receiver, and an identifier storing unit for storing the identifier and the password received by the identifier receiving unit in the other transmitter, as well as the fingerprint information capturing unit, the transmit unit, and the identifier transmitting unit. The receiver can include an identifier transmitting unit for transmitting the identifier and password specific to the transmitter to the other transmitter.

Preferably, the transmitter can include a rechargeable battery for supplying power to internal circuits. The receiver can includes a charging unit for charging the rechargeable battery when the transmitter is attached to the attaching unit.

Further objects and advantages of the present invention will be apparent from the following description of the preferred embodiments of the invention as illustrated in the accompanying drawings.

BRIEF DESCRIPTION OF THE DRAWINGS

FIG. 7 is a flow diagram showing the operation of an electronic key receiver;

DETAILED DESCRIPTION OF THE PREFERRED EMBODIMENTS

First Embodiment

Figure 1:
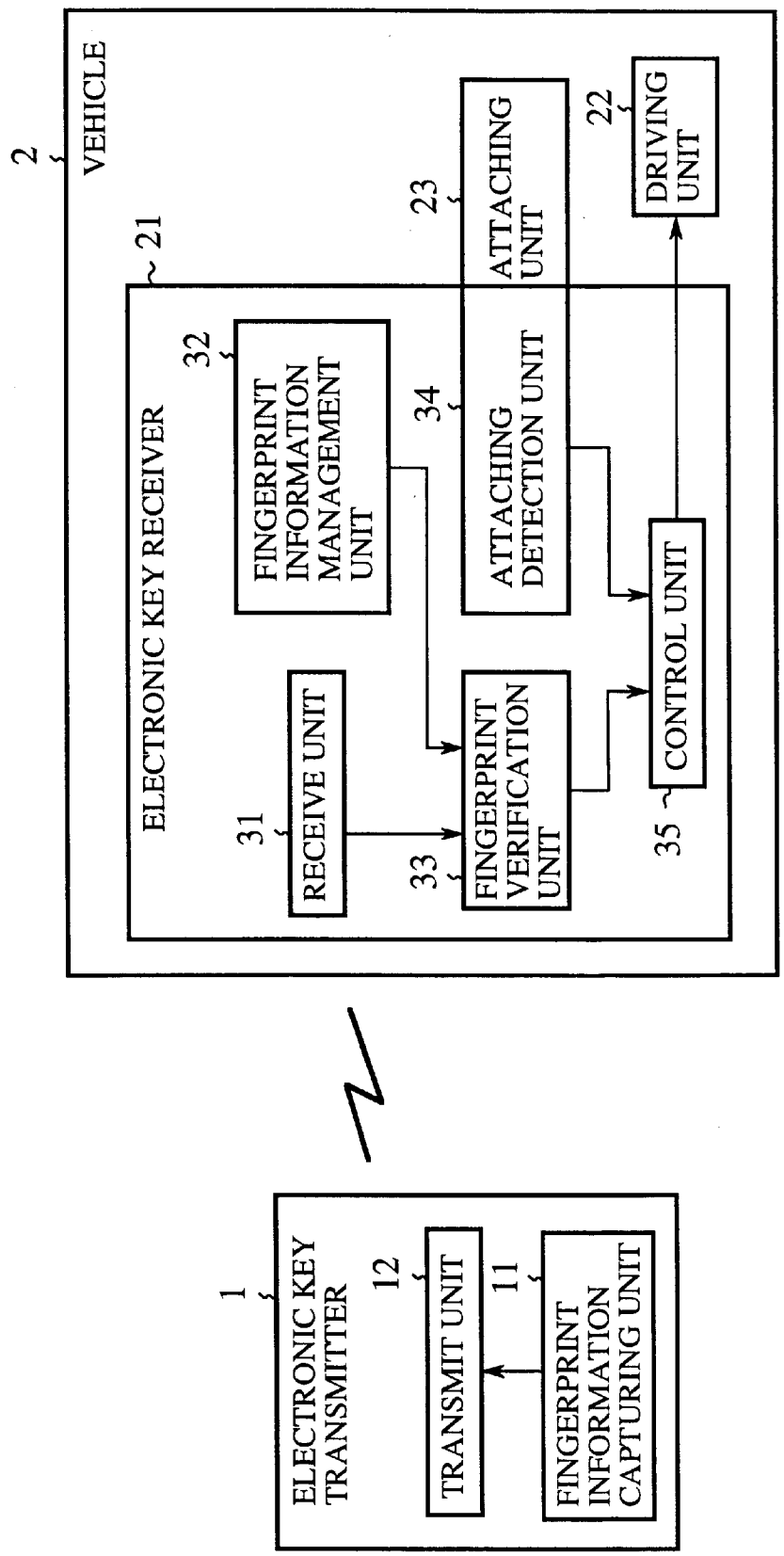
FIG. 1 is a block diagram showing the structure of a vehicle key system according to a first embodiment of the present invention.

Referring next to FIG. 1, there is illustrated a block diagram showing the structure of a vehicle key system according to a first embodiment of the present invention. In the figure, reference numeral 1 denotes an electronic key transmitter that can be carried by a user, and numeral 2 denotes a vehicle. The electronic key transmitter 1 is provided with a fingerprint information capturing unit 11 for capturing fingerprint information from the user's finger, and a transmit unit 12 for transmitting the fingerprint information captured by the fingerprint information capturing unit 11 to the vehicle 2. The vehicle 2 is provided with an electronic key receiver 21 for verifying the identity of the user by verifying the fingerprint information transmitted from the transmit unit 12 against a list of pieces of previously stored fingerprint information, and for controlling a driving unit 22 according to the verification result. The driving unit 22 includes a door lock driving unit, an engine control unit, a shifter control unit, and a steering wheel lock unit, as pieces of equipment in the vehicle. The vehicle 2 also includes an attaching unit to which the electronic key transmitter 1 can be attached.

The electronic key transmitter 21 is provided with a receive unit 31 for receiving the fingerprint information transmitted from the transmit unit 12 of the electronic key transmitter 1, a fingerprint information management unit 32 for holding and managing a list of pieces of previously stored fingerprint information about fingerprints of authorized users, a fingerprint verification unit 33 for verifying the fingerprint information received by the receive unit 31 against the list of pieces of previously stored fingerprint information, an attaching detection unit 34 for determining whether or not the electronic key transmitter 1 is attached to the attaching unit 23, and a control unit 35 for controlling the driving unit 22 according to the verification result from the fingerprint verification unit 33 and the detection result from the attaching detection unit 34.

In operation, when the user touches the fingerprint information capturing unit 11 of the electronic key transmitter 1 firmly with a finger, the fingerprint information capturing unit 11 captures fingerprint information from the fingerprint of the user's finger. The transmit unit 12 of the electronic key transmitter then transmits the fingerprint information.

The receive unit 31 of the electronic key receiver 21 mounted on the vehicle 2 receives the fingerprint information transmitted from the transmit unit 12 of the electronic key transmitter 1, and then furnishes the fingerprint information to the fingerprint verification unit 33. The fingerprint verification unit 33 sequentially reads one piece of previously stored fingerprint information about an authorized user's fingerprint from the fingerprint information management unit 32 and then compares the fingerprint information received by the receive unit 31 against the fingerprint information read out of the fingerprint information management unit 32. After the fingerprint verification unit 33 finds a match or completes the verification of the received fingerprint information against all pieces of previously stored fingerprint information about authorized users' fingerprints, it furnishes the verification result to the control unit 35.

The fingerprint information about the user's fingerprint can be a fingerprint image. In this case, the fingerprint verification unit 33 determines whether the fingerprint image matches one previously stored fingerprint image read out of the fingerprint information management unit 32 by comparing the features of the user's fingerprint image with those of the previously stored fingerprint image. As an alternative, the fingerprint information about the user's fingerprint can be the features of the user's fingerprint. In this case, the fingerprint verification unit 33 determines whether the features of the user's fingerprint match those of an authorized user's fingerprint.

When the control unit 35 receives the verification result indicating that previously stored fingerprint information about an authorized user's fingerprint matches the fingerprint information received by the receive unit 31, the control unit 35 controls the door lock driving unit (not shown) included with the driving unit 22 to release the lock of doors. In contrast, unless the fingerprint information received by the receive unit 31 matches any previously stored fingerprint information about an authorized user's fingerprint, the lock of doors cannot be released.

After that, when the user enters the vehicle and attaches the electronic key transmitter 1 to the attaching unit 23 located inside the vehicle, the attaching detection unit 34 detects the attachment of the electronic key transmitter 1 and then notifies the control unit 35 of the attachment of the electronic key transmitter 1. When the electronic key transmitter 1 is attached to the attaching unit 23 and the fingerprint information received by the receive unit 31 matches a previously stored piece of fingerprint information about one authorized user's fingerprint, the control unit 35 controls the engine control unit (not shown) included in the driving unit 22 to allow the user to start the engine. In this status, the user can actuate a command switch not shown to start the engine.

While the electronic key transmitter 1 is not attached to the attaching unit, the user cannot start the engine even if he or she actuates the command switch not shown. That is, even though the authentication confirms the identity of the user with the fingerprint information about the user's fingerprint, the user cannot start the engine until the electronic key transmitter 1 is attached to the attaching unit 23.

As previously mentioned, in accordance with the first embodiment of the present invention, the attaching unit 23 to which the electronic key transmitter 1 can be attached is disposed within the vehicle 2, and the attaching detection unit 34 for determining whether or not the electronic key transmitter 1 is attached to the attaching unit 23 is disposed in the electronic key receiver 21. Accordingly, the user is allowed to manipulate pieces of equipment provided by the vehicle, such as to start the engine, only when the user's electronic key transmitter 1 is attached to the attaching unit 23, thereby avoiding the need for providing a key cylinder and improving the security of the vehicle.

Embodiment 2

Figure 2:
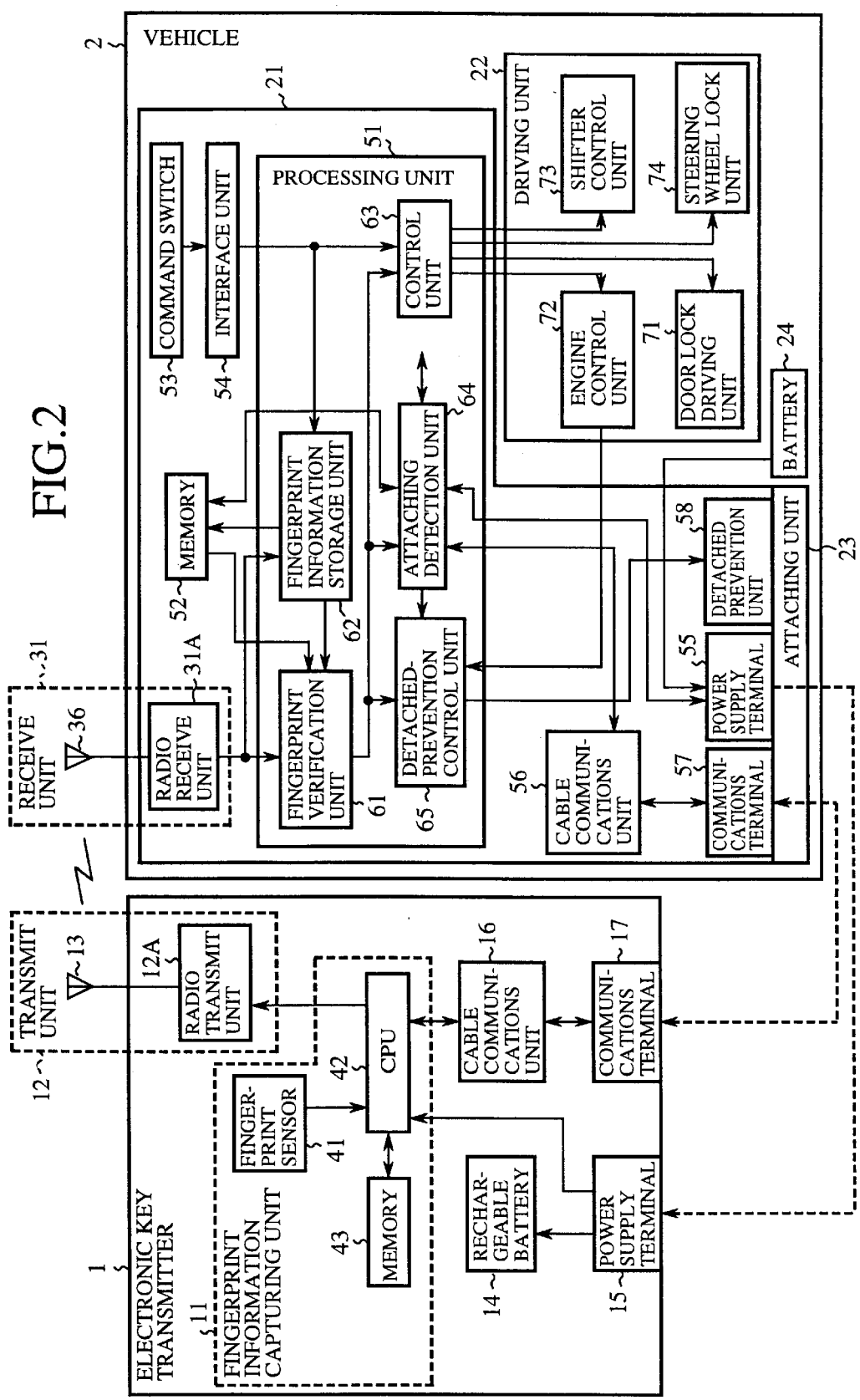
FIG. 2 is a block diagram showing the structure of a vehicle key system according to a second-embodiment of the present invention.

Referring next to FIG. 2, there is illustrated a block diagram showing the structure of a vehicle key system according to a second embodiment of the present invention. An electronic key transmitter 1 as shown in FIG. 1 is provided with a fingerprint sensor 41 for illuminating a user's finger and detecting light reflected from the finger to capture a fingerprint image, a central processing unit or CPU 42 for performing a variety of processes according to a program, and a memory 43, such as a RAM or ROM, for storing the program defining the variety of processes, and an identification code and a password specific to the electronic key transmitter 1. A fingerprint information capturing unit 11 consists of the fingerprint sensor 41, the CPU 42, and the memory 43.

The electronic key transmitter 1 further includes a radio transmit unit 12A for transmitting the fingerprint information captured by the fingerprint information capturing unit 11 by way of an antenna 13 via radio frequencies, a rechargeable battery 14 that can be charged with electrical power supplied thereto by way of a pair of power supply terminals 15, for supplying electrical power to internal circuits of the electronic key transmitter 1, such as the fingerprint sensor and so on, and a cable communications unit 16 for transmitting and receiving an identification code and a password, by way of a pair of communications terminals 17, to and from an external device connected to the electronic key transmitter 1.

Figure 3:
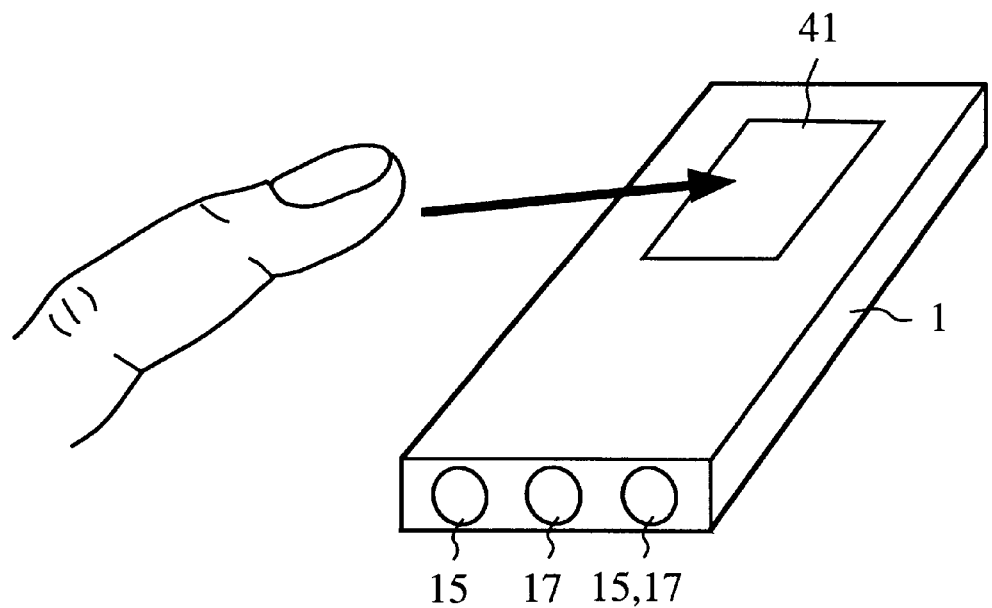
FIG. 3 is a perspective view showing an example of an electronic key transmitter.

Referring next to FIG. 3, there is illustrated a perspective view of the electronic key transmitter 1. As shown in FIG. 3, the fingerprint sensor 41 is disposed on a lateral surface of the electronic key transmitter 1, and one power supply terminal 15, one communications terminal 17, and a common terminal that serves as power supply and communications terminals 15 and 17 and that can be connected to a ground potential are disposed on a bottom surface of the electronic key transmitter 1. When a user touches the fingerprint sensor 14 firmly with his or her finger, the fingerprint sensor 14 captures a fingerprint image to generate fingerprint information.

As shown in FIG. 2, the vehicle 2 is provided with an electronic key receiver 21 for verifying the fingerprint information from the electronic key transmitter 1 against a list of pieces of previously stored fingerprint information so as to verify the identity of the user, and for controlling a driving unit 22 according to the verification result. The driving unit 22 includes a door lock driving unit 71 for locking doors and releasing the lock of the doors, an engine control unit 72 for starting or stopping the engine and for furnishing a given signal to a detached-prevention control unit 65 while the engine is working, a shifter control unit 73 for locking a shifter and releasing the lock of the shifter, and a steering wheel lock unit 74 for locking a steering wheel and releasing the lock of the steering wheel. The vehicle 2 also includes an attaching unit 23 to which the electronic key transmitter 1 can be attached and a battery 24.

The electronic key receiver 21 includes a radio receiver 31A for receiving the fingerprint information, which is transmitted by the electronic key transmitter 1 via radio frequencies, by way of an antenna 36, a processing unit 51 for performing a variety of processes and control operations, and a memory 52 for storing the list of pieces of fingerprint information about fingerprints of authorized users and an identification code and a password identifying the authorized electronic key transmitter 1. The processing unit 51 can be a CPU, and a program defining a variety of processes that is to be performed by the CPU can be stored in the memory 52.

The electronic key receiver 21 also includes a command switch 53 that can be actuated by users when, for example, starting the engine, and an interface circuit 54 for furnishing information about manipulations done by users to the processing unit 51.

The vehicle 2 further comprises a power supply terminal 55 that is electrically connected to the power supply terminal 15 of the electronic key transmitter 1 when it is attached to the attaching unit 23, a cable communications unit 56 for transmitting or receiving an identification code and a password to or from the electronic key transmitter 1 by way of a communications terminal 57 that is electrically connected to the communications terminal 17 of the electronic key transmitter 1 when it is attached to the attaching unit 23, and a detached prevention unit 58 for preventing the electronic key transmitter 1 from becoming detached from the attaching unit 23.

The processing unit 51 is provided with a fingerprint verification unit 61 for verifying the fingerprint information received by the radio receiver 31A against the list of pieces of fingerprint information about fingerprints of authorized users, which is stored in the memory 52, a fingerprint information storage unit 62 for storing fingerprint information about an authorized user's fingerprint to the memory 52, and a control unit 63 for controlling the driving unit 22 according to the verification result from the fingerprint verification unit 61 and a detection result from an attaching detection unit 64, and according to manipulations done by users through the command switch 53. The attaching detection unit 64 is included in the processing unit 51 and determines whether or not the electronic key transmitter 1 is attached to the attaching unit 23. The detached-prevention control unit 65 is included in the processing unit 51 and controls the detached prevention unit 58.

Figure 4:
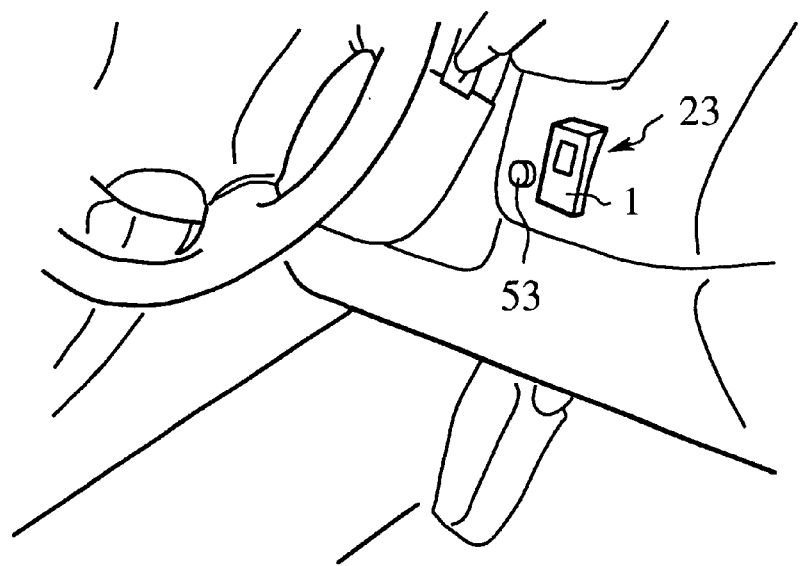
FIG. 4 is a perspective view showing a command switch and the electronic key transmitter attached to an attaching unit.

Referring next to FIG. 4, there is illustrated a perspective view showing the electronic key transmitter 1 attached to the attaching unit 23 and so forth. As shown in FIG. 4, the attaching unit 23 and the command switch 53 are mounted on part of a front panel of the vehicle in the vicinity of the steering wheel. The electronic key transmitter 1 can be attached to the attaching unit 23.

Figure 5A:
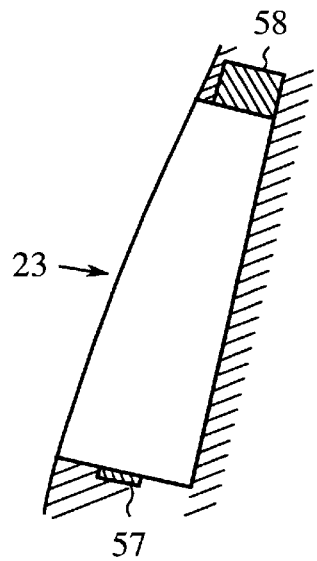
FIGS. 5(a) and 5(b) are cross-sectional views of the attaching unit to which no electronic key transmitter is attached and the attaching unit to which the electronic key transmitter is attached.
Figure 5B:
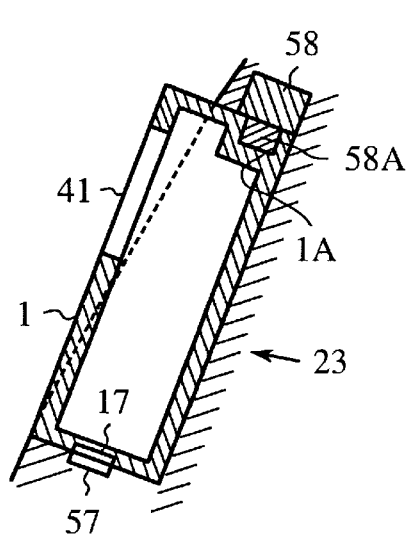

Referring next to FIGS. 5(a) and 5(b), there are illustrated cross-sectional views showing the vicinity of the attaching unit 23. As shown in FIG. 5(a), both the power supply terminal 55 and the communication terminal 57 can be disposed on an inner bottom surface of the attaching unit 23, and the detached prevention unit 58 can be disposed on an inner upper surface of the attaching unit 23. As shown in FIG. 5(b), when the electronic key transmitter 1 is attached to the attaching unit 23, the communications terminal 17 is coupled to the communications terminal 57 and a protrusion member 58A projecting from the detached prevention unit 58 is engaged into a hole 1A formed on an upper surface of the electronic key transmitter 1, so that the electronic key transmitter 1 is secured to the attaching unit 23.

Figure 6A:
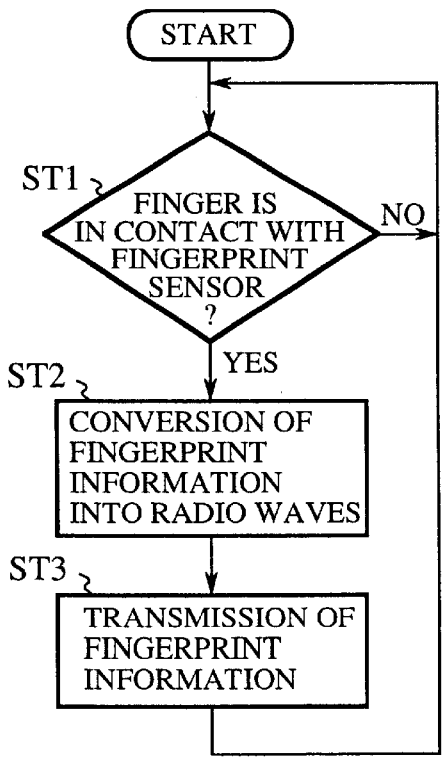
FIGS. 6(a) and 6(b) are flow diagrams showing the operation of the electronic key transmitter.
Figure 6B:
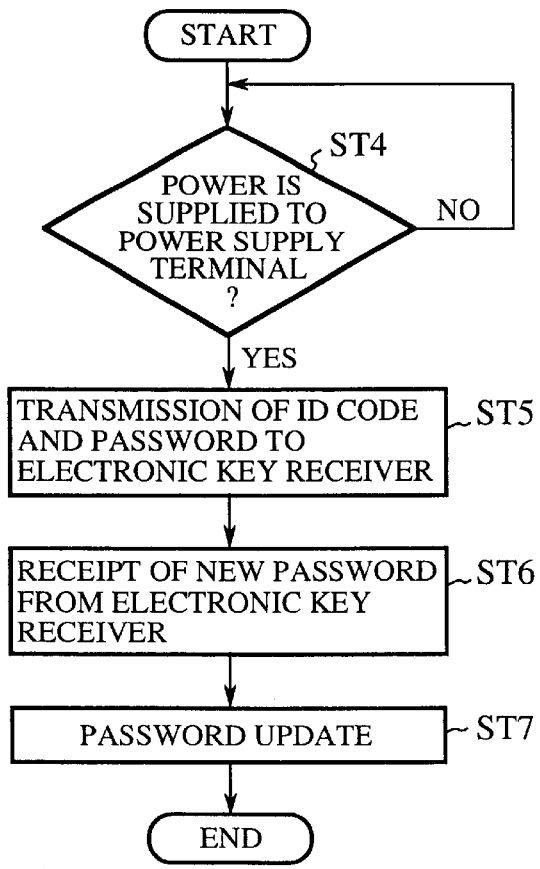

Referring next to FIGS. 6(a) and 6(b), there are illustrated flow diagrams showing the operation of the electronic key transmitter 1. The CPU 42 of the electronic key transmitter 1, in step ST1, determines whether or not a finger is in contact with the fingerprint sensor 41. The CPU 42 also, in step ST4, determines whether or not power is supplied to the power supply terminal 15. The CPU 42 continues to wait until a finger is in contact with the fingerprint sensor 41 or power is supplied to the power supply terminal 15. By monitoring a current flowing from the power supply terminal 15 to the rechargeable battery 14, for example, the CPU 42 can determine whether or not power is supplied to the power supply terminal 15.

When the CPU 42 determines that a finger is in contact with the fingerprint sensor 41, it, in step ST2 of FIG. 6(a), furnishes a fingerprint image, which is fingerprint information obtained by the fingerprint sensor 41, to the radio transmitter 12A. The radio transmitter 12A then modulates a carrier with the fingerprint image so as to convert the fingerprint information into a radio wave. The radio transmitter 12A, in step ST3, radiates the radio wave via the antenna 13. After that, the CPU 42 reverts back to step ST1 in which it is in the wait state.

When the CPU 42 determines that power is supplied to the power supply terminal 15, that is, when the electronic key transmitter 1 is securely attached to the attaching unit 23, the CPU 42, in step ST5 of FIG. 6(b), reads the identification code and the password from the memory 43, and then furnishes them to the cable communications unit 16. The cable communications unit 16 then transmits the identification code and the password to the electronic key receiver 21 by way of the communications terminal 17.

The cable communications unit 16 then, in step ST6, receives a new password transmitted thereto from the electronic key receiver 21 mounted on the vehicle 2 by way of the communications terminal 17, and furnishes the new password to the CPU 42. After that, the CPU 42, in step ST7, replaces the password stored in the memory 43 with the new password from the electronic key receiver 21.

In this way, every time a finger is in contact with the fingerprint sensor 41, the fingerprint information about the finger's fingerprint is transmitted to the electronic key receiver 21 mounted on the vehicle 2. After that, when the electronic key transmitter 1 is attached to the attaching unit 23, the identification code specific to the electronic key transmitter 1 and the current password are furnished to the electronic key receiver 21 and the current password is replaced by a new password furnished from the electronic key receiver 21. In addition, power from the battery 24 of the vehicle 2 is supplied to the power supply terminal 15 of the electronic key transmitter. When the battery 24 can have a voltage different from that of the rechargeable battery 14, the electronic key transmitter 1 has to include a voltage converter.

Figure 8:
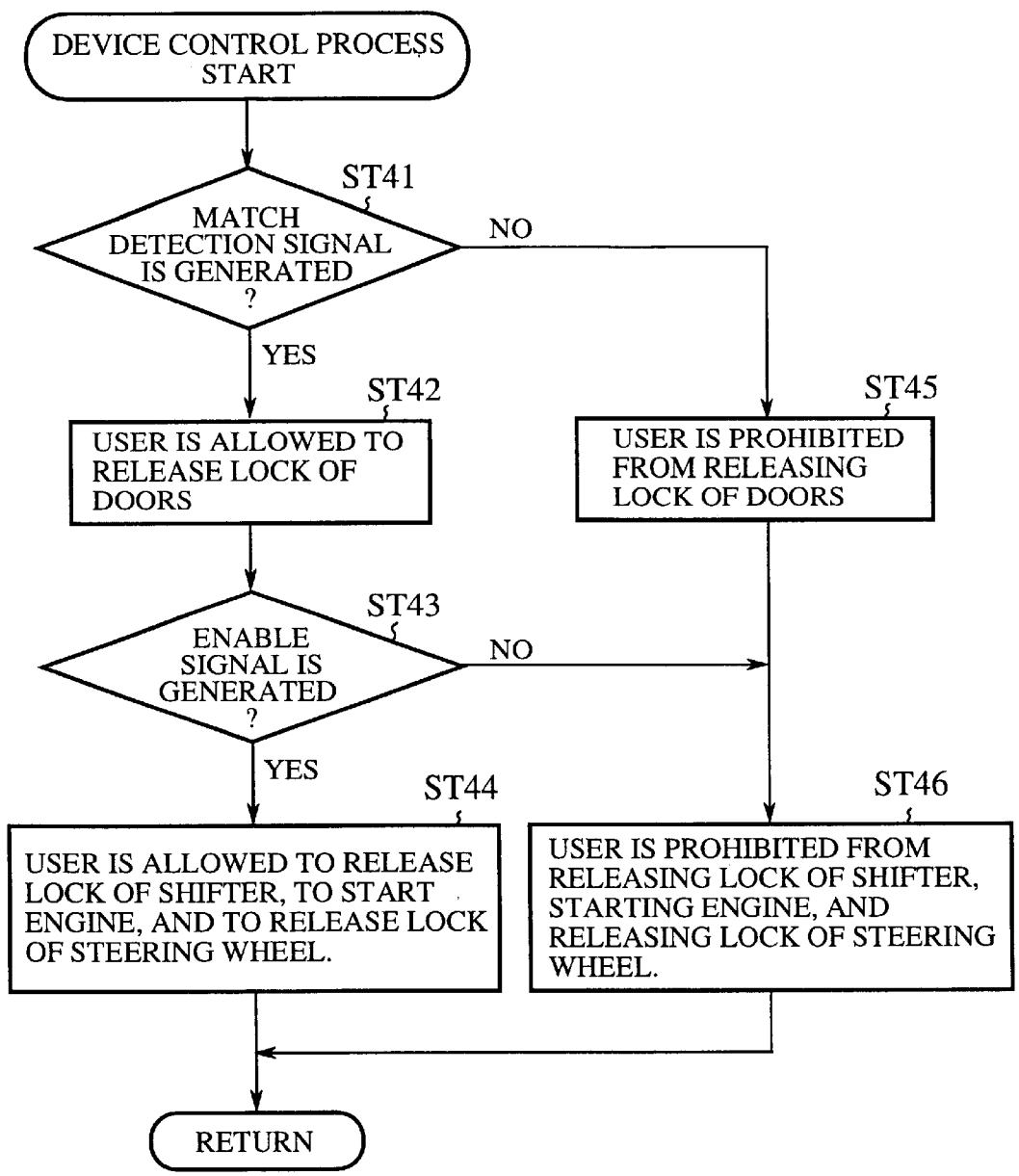
FIG. 8 is a flow diagram showing a control process, as shown in FIG. 7, of controlling a variety of pieces of equipment in a vehicle.
Figure 9:
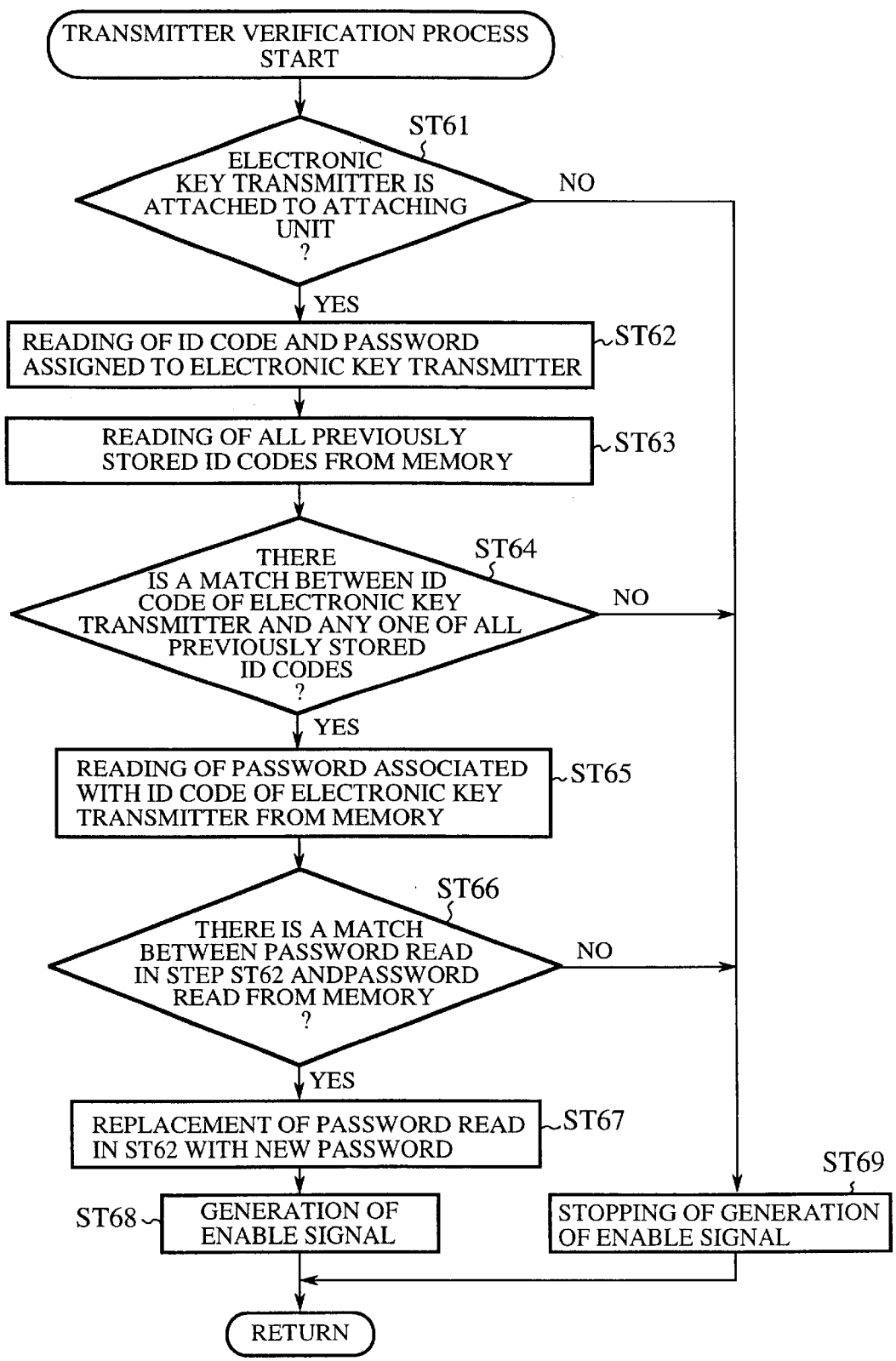
FIG. 9 is a flow diagram showing a process, as shown in FIG. 7, of verifying the identity of the electronic key transmitter.
Figure 10:
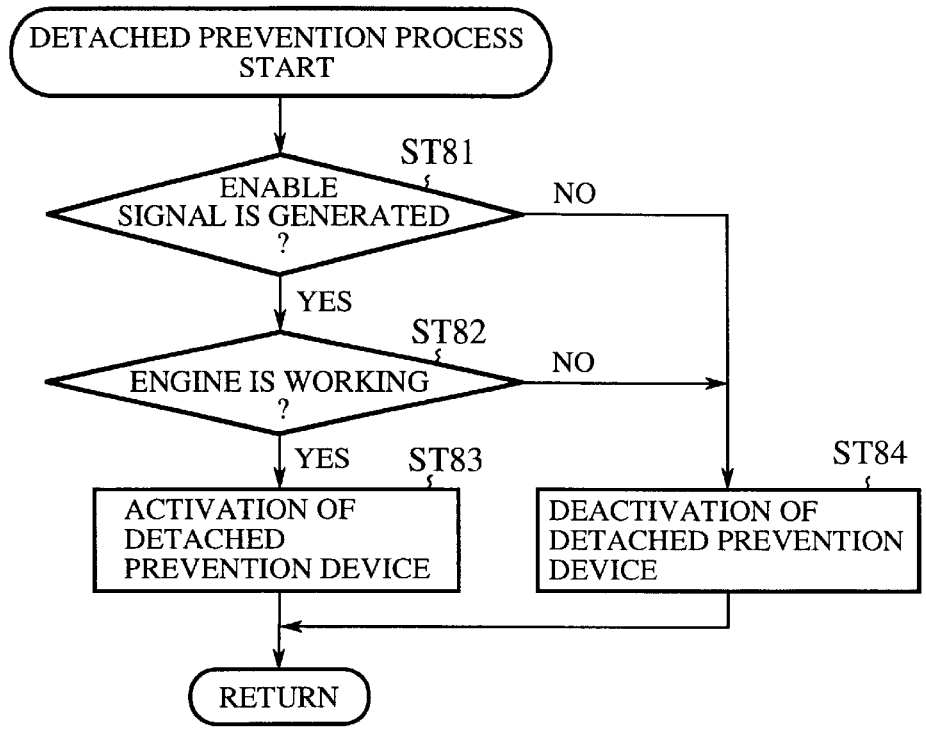
FIG. 10 is a flow diagram showing a process, as shown in FIG. 7, of preventing the electronic key transmitter from becoming detached from the attaching unit.

Referring next to FIG. 7, there is illustrated a flow diagram showing the operation of the electronic key receiver 21. FIG. 8 is a flow diagram showing a control process, as shown in FIG. 7, of controlling the variety of pieces of equipment 71 to 74, FIG. 9 is a flow diagram showing a process, as shown in FIG. 7, of verifying the identity of the electronic key transmitter 1, and FIG. 10 is a flow diagram showing a process, as shown in FIG. 7, of preventing the electronic key transmitter 1 from becoming detached from the attaching unit.

The radio receiver 31A of the electronic key receiver 21 mounted on the vehicle 2, in step ST21, demodulates the radio wave received via the antenna 36, and continues to wait for fingerprint information. When the radio receiver 31A receives fingerprint information, it furnishes the fingerprint information to both the fingerprint verification unit 61 and the fingerprint information storage unit 62. After that, the fingerprint information storage unit 62, in step ST22, determines whether or not to store the received fingerprint information to the memory 52 according to information about an actuation of the command switch 53 performed by the user, which is applied thereto by way of the interface circuit 54.

When the fingerprint information storage unit 62 determines that it should store the fingerprint information to the memory 52, it, in step ST23, stores the fingerprint information to the memory 52. In this way, the electronic key receiver 21 can store fingerprint information about an authorized user's fingerprint to the memory 52.

In contrast, when the fingerprint information storage unit 62, in step ST22, determines that it should not store the fingerprint information to the memory 52, it notifies the fingerprint verification unit 61 of the determination. The fingerprint verification unit 61 then, in step ST24, sequentially reads one piece of previously stored fingerprint information from the memory 52 and then compares the received fingerprint information with the previously stored fingerprint information. If the difference between the features extracted from the received fingerprint information and those extracted from the previously stored fingerprint information falls within a prescribed range, the fingerprint verification unit 61 determines that they match. The features of fingerprint information include the size and contours of the fingerprint, the presence or absence of whorls, the number of ridges, and the orientations of streams of ridges. When the fingerprint verification unit 61, in step ST25, determines that there does not exist a match between the received fingerprint information and any piece of fingerprint information stored in the memory 52, it stops the fingerprint information verification process and reverts back to step ST21 in which it is in the wait state.

In contrast, when the fingerprint verification unit 61 determines that a match exists in step ST25, it furnishes a match detection signal to the control unit 63, the attaching detection unit 64, and the detached-prevention control unit 65 so as to notify them of the fact that there is a match between the received fingerprint information and one piece of previously stored fingerprint information. When the control unit 63 receives the match detection signal, it, in step ST26, starts the control process of controlling the plurality of pieces of equipment 71 to 74. When the attaching detection unit 64 receives the match detection signal, it, in step ST27, starts the verification process of verifying the identity of the electronic key transmitter. When the detached-prevention control unit 65 receives the match detection signal, it, in step ST28, starts the process of preventing the electronic key transmitter from becoming detached from the attaching unit.

In the process of controlling the plurality of pieces of equipment of step ST26, the control unit 63, in step ST41 of FIG. 8, determines whether or not it is receiving the match detection signal from the fingerprint verification unit first. When the control unit 63 determines that it is receiving the match detection signal, it, step ST42, controls the door lock driving unit 71 so as to release the lock of the doors. After that, the control unit 63, in step ST43, determines whether or not it is receiving an enable signal, which will be described below, from the attaching detection unit 64. When the control unit 63 determines that it is receiving the enable signal, it, in step ST44, controls the engine control unit 72, the shifter control unit 73, and the steering wheel lock unit 74 so as to allow the user to start the engine and to release the lock of the shifter and steering wheel of the vehicle. When the user actuates the command switch 53 while he or she is allowed to start the engine, the control unit 63 controls the engine control unit 72 to start the engine.

In contrast, when the control unit 63, in step ST41, determines that it is not receiving the match detection signal, it, in step ST45, prohibits the door lock driving unit 71 from releasing the lock of the doors. The control unit 63 also, in step ST46, prohibits the engine control unit 72 from starting the engine, the shifter control unit 73 from releasing the lock of the shifter, and the steering wheel lock unit 74 from releasing the lock of the steering wheel. Further, when the control unit 63, in step ST43, determines that it is not receiving the enable signal, it advances to step ST46 in which it prohibits the engine control unit 72 from starting the engine, the shifter control unit 73 from releasing the lock of the shifter, and the steering wheel lock unit 74 from releasing the lock of the steering wheel. The above-mentioned control processing is repeatedly performed as shown in FIG. 7.

In the process of verifying the identity of the electronic key transmitter of step ST27, the attaching detection unit 64, in step ST61 of FIG. 9, determines whether or not the electronic key transmitter 1 is attached to the attaching unit 23. When the attaching detection unit 64 determines that the electronic key transmitter 1 is attached to the attaching unit 23, it, in step ST62, reads the identification code identifying the electronic key transmitter 1 and the current password, which have been received by the cable communications unit 56 by way of the communications terminal 57, from the cable is communications unit 56. The attaching detection unit 64, in step ST63, reads all identification codes stored in the memory 52, and then, in step ST64, determines whether the received identification code identifying the electronic key transmitter 1 matches one of all the identification codes read from the memory 52.

The identification code identifying the authorized electronic key transmitter 1 and an initial password are stored into the memory 52 in advance. The memory 52 can store a plurality of identification codes identifying a plurality of authorized electronic key transmitters, respectively, and a plurality of initial passwords.

When the received identification code identifying the electronic key transmitter 1 matches one identification code stored in the memory 52, the attaching detection unit 64 also, in step ST65, reads a corresponding password from the memory 52 and then, in step ST66, determines whether the corresponding password matches the current password transmitted thereto from the electronic key transmitter 1.

When the current password from the electronic key transmitter 1 matches the corresponding password stored in the memory 52, the attaching detection unit 64, in step ST67, generates a new password and then replaces the current password stored in the memory 52 with the new password. The attaching detection unit 64 then furnishes the new password to the cable communications unit 56 so as to make the cable communications unit 56 transmit the new password to the electronic key transmitter 1 by way of the communications terminal 57. After that, the attaching detection unit 64, in step ST68, furnishes the enable signal to both the control unit 63 and the detached-prevention control unit 65.

In contrast, when the attaching detection unit 64, in step ST61, determines that the electronic key transmitter 1 is not attached to the attaching unit 23, it stops furnishing the enable signal. When the received identification code identifying the electronic key transmitter 1 does not match any identification code stored in the memory 52, in step ST64, the attaching detection unit 64, in step ST69, determines that the electronic key transmitter 1 is not an authorized one and then stops furnishing the enable signal. In addition, when the received current password from the electronic key transmitter 1 does not match the corresponding password associated with the identification code identifying the electronic key transmitter 1, in step ST66, the attaching detection unit 64, in step ST69, determines that the electronic key transmitter 1 is not an authorized one and then stops furnishing the enable signal.

The transmitter verification process is repeatedly performed as shown in FIG. 7. Instead of producing a new password every time the electronic key transmitter 1 is authenticated, the attaching detection unit 64 can generate a new password and update the contents of the memory with the new password at the expiration of a predetermined time period after the previous generation, or every a predetermined number of times that the authentication is performed, for example.

In the process of preventing the electronic key transmitter from becoming detached from the attaching unit, the detached-prevention control unit 65, in step ST81 of FIG. 10, determines whether or not it is receiving the enable signal from the attaching detection unit 64. When the detached-prevention control unit 65 determines that it is receiving the enable signal, it further, in step ST82, determines whether or not it is receiving a signal indicating the engine is working from the engine control unit 72. If the detached-prevention control unit 65 determines that it is receiving the signal, it, in step ST83, enables the detached prevention unit 58 to secure the electronic key transmitter 1 thereto, as shown in FIG. 5(*b*).

In contrast, when the detached-prevention control unit 65, in step ST81, determines that it is not receiving the enable signal, it enables the detached prevention unit 58 to release the lock of the electronic key transmitter 1. Similarly, when the detached-prevention control unit 65, in step ST82, determines that the engine is not working, the detached-prevention control unit 65 enables the detached prevention unit 58 to release the lock of the electronic key transmitter 1. The detached prevention process is repeatedly performed as shown in FIG. 7.

As previously mentioned, in accordance with the second embodiment of the present invention, the vehicle key system verifies the identity of the electronic key transmitter 1 based on the identification code and password assigned to the electronic key transmitter 1, in addition to checks into the identity of the user based on the fingerprint information. Accordingly, even though a fraudulent use of the electronic key transmitter 1 is made, the vehicle key system of the second embodiment can prevent fraud, such as a fraudulent release of the lock of the doors, from being committed on the vehicle 2. Thus the vehicle key system can implement an immobilizer function. In addition, every time the electronic key transmitter 1 is attached to the attaching unit, the current password is replaced by a new password. Thereby, the security of the vehicle can be improved.

Since a password can be provided for each of a plurality of authorized electronic key transmitters 1 having its own identification code, the vehicle key system can verify the identity of a current password received from any one of the plurality of authorized electronic key transmitters, thereby improving the security of the vehicle.

In addition, since the electronic key transmitter 1 is secured to the attaching unit 23 while the engine is working, the vehicle key system of the second embodiment makes it possible to prevent the electronic key transmitter 1 from accidentally becoming detached from the attaching unit 23, thus preventing the engine control unit 72 from malfunctioning such as abruptly stopping the engine.

Furthermore, since the electronic key transmitter 1 includes the rechargeable battery 14 that can be charged up, the electronic key transmitter can be reduced in size and weight.

Figure 11:
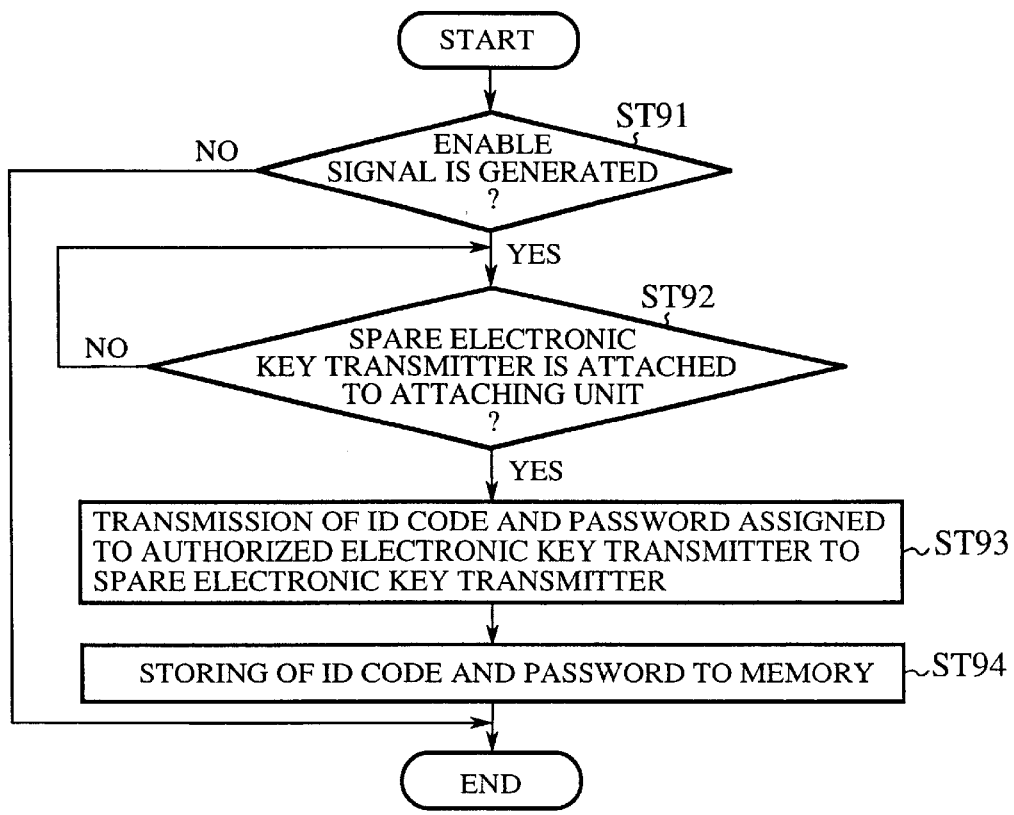
FIG. 11 is a flow diagram showing a process of producing a duplicate electronic key transmitter.

Numerous variants can be made in the exemplary embodiment shown. For example, a vehicle key system of a variant can have a function of allowing a user to provide a duplicate electronic key transmitter. Referring next to FIG. 11, there is illustrated a flow diagram showing the process of producing a duplicate electronic key transmitter in accordance with the variant. The process is based on the premise that the user is authenticated and the authorized electronic key transmitter 1 is attached to the attaching unit 23. In this state, when the user performs a predetermined manipulation on the electronic key receiver 21 to switch a current operating mode to a mode in which the process of producing a duplicate electronic key transmitter is carried out, the processing unit 51 of the electronic key receiver 21, in step ST91, determines whether or not the attaching detection unit 64 is furnishing the enable signal. If so, the processing unit 51 further, in step ST92, determines whether or not a spare electronic key transmitter that is to be a duplicate electronic key transmitter is attached to the attaching unit 23 by means of the attaching detection unit 64. The user has to detach the authorized electronic key transmitter 1 from the attaching unit 23 prior to attaching the spare electronic key transmitter to the attaching unit. After the spare electronic key transmitter has been attached to the attaching unit 23, the attaching detection unit 64, in step ST93, reads the identification code and password assigned to the authorized electronic key transmitter 1 that has already been authenticated from the memory 52, and then transmits them to the spare electronic key transmitter by way of the cable communications unit 56. The spare electronic key transmitter, in step ST94, receives the identification code and password and then stores them to a memory thereof. In this way, the user can produce a duplicate electronic key transmitter by himself or herself without the aid of a car dealer, or a service shop.

As an alternative, the identification code and password assigned to the authorized electronic key transmitter 1 can be transmitted to the spare electronic key transmitter via radio frequencies without attachment of the spare electronic key transmitter to the attaching unit 23 instead of the authorized electronic key transmitter 1. It is preferable that only a specific user, such as a master user, can be allowed to make the electronic key receiver perform the process of producing a duplicate electronic key transmitter. Only when a specific user is authenticated, the processing unit 51 of the electronic key receiver 21 can shift to the mode in which the process of producing a duplicate electronic key transmitter is enabled. In this case, it is preferable that only authorized persons in car dealers, maintenance factories, or the like are allowed to register one or more specific users to the system, so as to prevent unauthorized duplication of electronic key transmitters.

It is apparent that a cover can be provided for protecting the fingerprint sensor 41 from being soiled and impacts when it is not used. The cover can be so constructed as to slide, or can alternatively be opened or closed like a hinged door. The cover can also have a mechanism of removing dirt from the surface of the fingerprint sensor 41 when it is opened and when it is closed.

The antennas 13 and 36 can be rod-type or coil-type ones. As an alternative, they can be antenna patterns disposed on respective circuit boards.

The rechargeable battery 14 can be secured to the electronic key transmitter 1. As an alternatively, the rechargeable battery 14 can be a detachable one.

It is also apparent that instead of the cable communications units 16 and 56, and the communications terminals 17 and 57, the electronic key transmitter 1 and the electronic key receiver 21 can have either respective radio communications units for transmitting information using radio waves of intensity that is not enough to allow the interception of the radio waves, or respective optical communications units for establishing optical communication with each other using diodes and photo diodes. As an alternative, the electronic key transmitter 1 and the electronic key receiver 21 can have respective sound communications units for establishing sound communication with each other using speakers and microphones.

It is further clear that instead of the direct power supply by way of the power supply terminals 15 and 55, electromagnetic induction using a coil can supply power to the electronic key transmitter 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle key system for verifying identity of fingerprint information about a user's fingerprint and for controlling pieces of equipment in a vehicle according to a verification result, said system comprising:

a transmitter including a fingerprint information capturing means for capturing fingerprint information from a user's fingerprint, and a transmitting means for transmitting the finger print information captured by said fingerprint information capturing means;

an attaching means disposed in the vehicle, for attaching said transmitter thereto; and a receiver disposed in the vehicle, including a receiving means for receiving the fingerprint information transmitted from said transmitting means of said transmitter, a fingerprint verification means for verifying the fingerprint information against a list of pieces of previously stored fingerprint information, an attaching detection means for determining whether or not said transmitter is attached to said attaching means, and a control means for controlling the pieces of equipment in the vehicle according to a verification result from said fingerprint verification means and a detection result from said attaching detection means, wherein said receiver includes a transmitter verification means for verifying identify of said transmitter, and wherein said control means controls the pieces of equipment in the vehicle according to the verification result from said fingerprint verification means, the detection result from said attaching detection means, and a verification result from said transmitter verification means, wherein said transmitter includes an identifier transmitting means for transmitting an identifier specific to said transmitter, and wherein said receiver includes an identifier receiving means for receiving the identifier from said transmitter, and said transmitter verification means compares the identifier received by said identifier receiving means with one or more previously stored identifiers to verify the identity of said transmitter, and wherein said vehicle key system further comprises another transmitter including an identifier receiving means for receiving an identifier from said receiver, and an identifier storing means for storing the identifier received by said identifier receiving means in said other transmitter, as well as said fingerprint information capturing means, said transmitting means, and said identifier transmitting means, wherein said receiver includes an identifier transmitting means for transmitting the identifier specific to said transmitter to said other transmitter.

2. A vehicle key system for verifying identity of fingerprint information about a user's fingerprint and for controlling pieces of equipment in a vehicle according to a verification result, said system comprising:

a transmitter including a fingerprint information capturing means for capturing fingerprint information from a user's fingerprint, and a transmitting means for transmitting the finger print information captured by said fingerprint information capturing means;

an attaching means disposed in the vehicle, for attaching said transmitter thereto; and a receiver disposed in the vehicle, including a receiving means for receiving the fingerprint information transmitted from said transmitting means of said transmitter, a fingerprint verification means for verifying the fingerprint information against a list of pieces of previously stored fingerprint information, an attaching detection means for determining whether or not said transmitter is attached to said attaching means, and a control means for controlling the pieces of equipment in the vehicle according to a verification result from said fingerprint verification means and a detection result from said attaching detection means, wherein said receiver includes a transmitter verification means for verifying identify of said transmitter, and wherein said control means controls the pieces of equipment in the vehicle according to the verification result from said fingerprint verification means, the detection result from said attaching detection means, and a verification result from said transmitter verification means, wherein said transmitter includes an identifier transmitting means for transmitting an identifier specific to said transmitter, and wherein said receiver includes an identifier receiving means for receiving the identifier from said transmitter, and said transmitter verification means compares the identifier received by said identifier receiving means with one or more previously stored identifiers to verify the identity of said transmitter, wherein said identifier transmitting means transmits a password as well as the identifier, and wherein said identifier receiver means also receives the password from said transmitter, and said transmitter verification means also compares the password received by said identifier receiving means against a previously stored corresponding password, in addition to the comparison between the identifier received by said identifier receiving means and one or more previously stored identifiers, to verify the identity of said transmitter, and wherein said vehicle key system further comprises another transmitter including an identifier receiving means for receiving an identifier and a password from said receiver, and an identifier storing means for storing the identifier and the password received by said identifier receiving means in said other transmitter, as well as said fingerprint information capturing means, said transmitting means, and said identifier transmitting means, wherein said receiver includes an identifier transmitting means for transmitting the identifier and password specific to said transmitter to said other transmitter.

* * * * *